US009828103B2

(12) United States Patent
Cassagne et al.

(10) Patent No.: US 9,828,103 B2
(45) Date of Patent: Nov. 28, 2017

(54) ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

(71) Applicant: Airbus Operations (SAS), Toulouse (FR)

(72) Inventors: Jerome Cassagne, Toulouse (FR); Thomas Deforet, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 452 days.

(21) Appl. No.: 14/553,416

(22) Filed: Nov. 25, 2014

(65) Prior Publication Data

US 2015/0166190 A1 Jun. 18, 2015

(30) Foreign Application Priority Data

Dec. 12, 2013 (FR) ..................... 13 62477

(51) Int. Cl.
*B64D 27/26* (2006.01)
*F16B 39/10* (2006.01)
*F16B 39/04* (2006.01)

(52) U.S. Cl.
CPC ............ *B64D 27/26* (2013.01); *F16B 39/10* (2013.01); *B64D 2027/262* (2013.01); *F16B 39/04* (2013.01); *Y10T 403/32041* (2015.01)

(58) Field of Classification Search
CPC ........ B64D 27/26; B64D 27/12; B64D 27/18; B64D 2027/262; B64D 2027/266;

(Continued)

(56) References Cited

U.S. PATENT DOCUMENTS 1,724,985 A * 8/1929 Winterbottom ............ F16J 1/18
  403/154
1,819,887 A * 8/1931 Fry .......................... F16C 5/00
  384/11

(Continued)

FOREIGN PATENT DOCUMENTS

| CH | 324802  | 10/1957 |
| DE | 971597  | 2/1959  |
| FR | 2887853 | 1/2007  |

OTHER PUBLICATIONS

French Search Report, Aug. 22, 2014.

*Primary Examiner* — Michael P Ferguson
(74) *Attorney, Agent, or Firm* — Greer, Burns & Crain, Ltd.

(57) ABSTRACT

An assembly having an articulation spindle mounted in a first sleeve inserted into a first arm of a clevis and in a second sleeve inserted into a second arm of said clevis said assembly comprising a blocking device. The blocking device comprising a screw with a first cylindrical portion which is screwed into an extension of the second sleeve and against which the second end of the articulation spindle can come to press, and a second portion, in the extension of the first portion, with a smaller cross section than said first cylindrical portion, a locking washer which is interposed between the second portion of the screw and the extension of the second sleeve in a locked position, and a longilinear element which passes through the screw and the second sleeve in a locked state.

13 Claims, 4 Drawing Sheets

(58) Field of Classification Search
CPC ..... Y10T 403/32893; Y10T 403/32909; Y10T 403/32861; Y10T 403/32918
See application file for complete search history.

(56) References Cited

U.S. PATENT DOCUMENTS

| | | | | |
|---|---|---|---|---|
| 4,597,499 A | * | 7/1986 | Hanula | B61G 7/10 213/50.5 |
| 4,889,458 A | * | 12/1989 | Taylor | F16B 21/10 403/156 |
| 8,469,622 B2 | * | 6/2013 | McClanahan | E02F 3/58 37/399 |
| 2008/0156930 A1 | | 7/2008 | Audart-Noel et al. | |

* cited by examiner

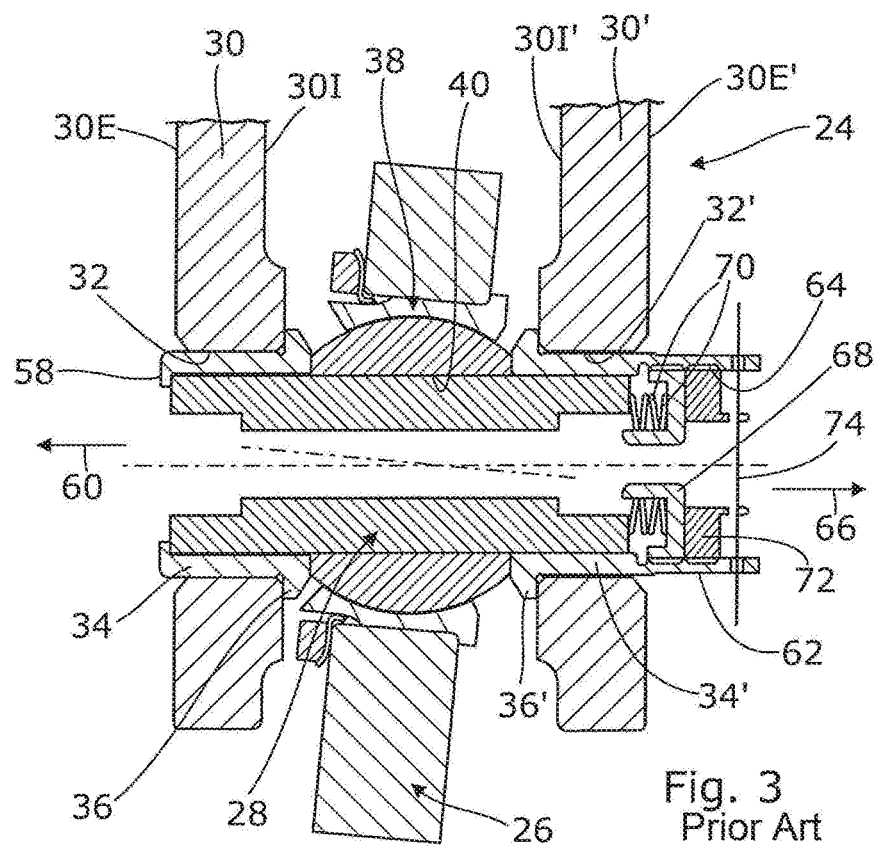
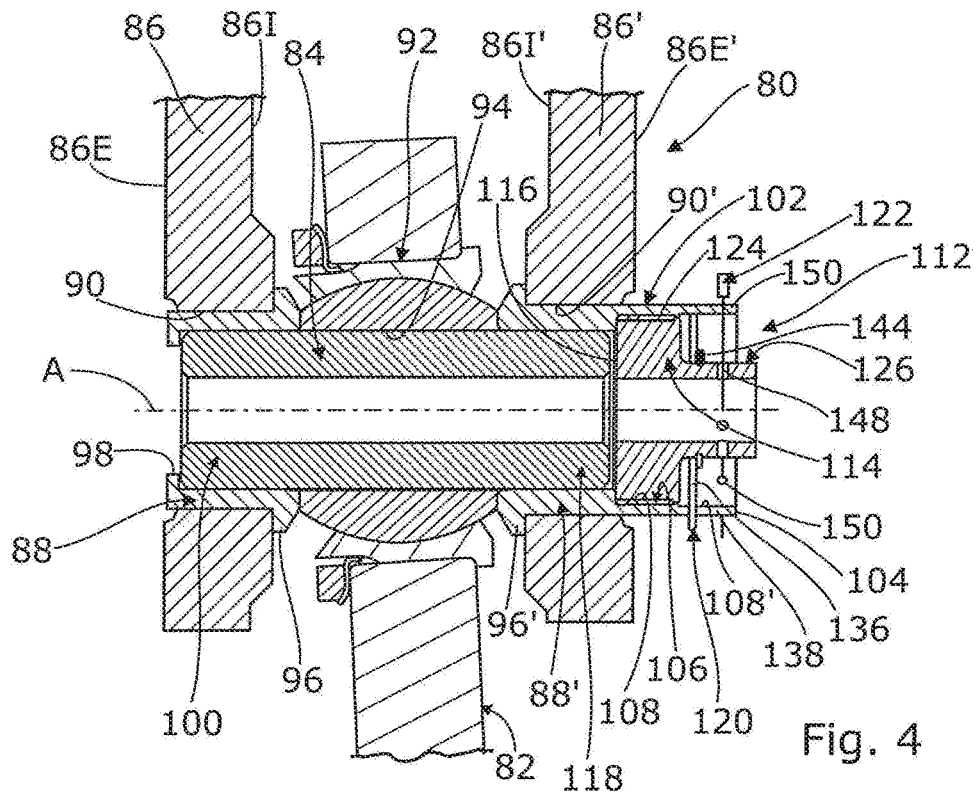

ASSEMBLY COMPRISING AN ARTICULATION SPINDLE SUPPORTED BY A CLEVIS AND IMMOBILIZED IN TRANSLATION BY A BLOCKING DEVICE INTEGRATING A DOUBLE ANTI-ROTATION SYSTEM

CROSS-REFERENCES TO RELATED APPLICATIONS

This application claims the benefit of the French patent application No. 1362477 filed on Dec. 12, 2013, the entire disclosures of which are incorporated herein by way of reference.

BACKGROUND OF THE INVENTION

The present invention relates to an assembly comprising an articulation spindle supported by a clevis and immobilized in translation by a blocking device integrating a double anti-rotation system.

In the field of aeronautics, according to one configuration shown in FIG. 1, an engine 10 is connected to a wing 12 of an aircraft via the intermediary of an attachment pylon 14.

The attachment pylon 14 is connected to the wing 12 via the intermediary of fasteners 16, 16', at the front and at the rear of the attachment pylon. In parallel, the engine 10 is connected to the attachment pylon 14 via the intermediary of fasteners 18, 18', at the front and at the rear of the engine. The connection between the engine 10 and the attachment pylon 14 comprises lateral link rods 20 which take up the thrust forces generated by the engine 10, each lateral link rod 20 being connected at a first end by a fastener 22 to the engine 10 and at a second end by a fastener 22' to the attachment pylon 14.

Some of these fasteners 16, 16', 18, 18', 22, 22' comprise at least one assembly with an articulation spindle connecting a clevis and a ferrule.

One embodiment of an assembly provided at the fastener 18' connecting the engine 10 and the attachment pylon 14 at the rear of the engine is shown in FIG. 2.

This assembly comprises a clevis 24 connected to the attachment pylon 14, a ferrule 26 connected to the engine and an articulation spindle 28 connecting the clevis 24 and the ferrule 26.

The clevis 24 comprises two arms 30, 30', each comprising an inner face 301, 301' and an outer face 30E, 30E', wherein the inner faces 301 and 301' face each other.

Each arm 30, 30' comprises a bore 32, 32' into which is inserted a sleeve 34, 34', the two sleeves 34, 34' being coaxial and aligned and having equal internal diameters.

In the following, the longitudinal direction corresponds to the direction of the axes of the sleeves 34, 34'.

Each sleeve 34, 34' comprises an outer shoulder 36, 36' which presses against the inner face 301, 301' of the arm into which it is inserted, so as to limit the movement in translation of said sleeves 34, 34' in the longitudinal direction.

The ferrule 26 comprises a swivel bearing 38 with a bore 40 whose diameter is substantially equal to the internal diameter of the sleeves 34, 34'.

The articulation spindle 28 comprises a hollow cylindrical body whose outer diameter is substantially equal to the internal diameter of the sleeves 34, 34' and the diameter of the bore 40 of the swivel bearing 38.

In order to avoid the articulation spindle 28 coming out of the sleeves and the fastener coming apart, the assembly comprises a blocking device for immobilizing the articulation spindle in translation in the longitudinal direction.

According to a first embodiment shown in FIG. 2, the blocking device comprises:
- a screw 42 with a shank 44 housed in the articulation spindle 28, a head 46 at a first end of the shank and a threaded portion 48 at a second end of the shank,
- a self-locking nut 50 which is screwed onto the threaded portion 48 of the screw 42,
- a first washer 52 which is interposed between the head 46 of the screw and the articulation spindle 28 and whose outer diameter is greater than the outer diameter of the articulation spindle,
- a second washer 54 which is interposed between the nut 50 and the articulation spindle 28 and whose outer diameter is greater than the outer diameter of the articulation spindle,
- a pin 56 which passes through the nut 50 and the shank 44 of the screw so as to immobilize the nut 50 with respect to the screw 42.

According to this embodiment, the self-locking nut 50 corresponds to a first anti-rotation system and the pin 56 corresponds to a second anti-rotation system.

During assembly, the screw 42 is introduced from a first end of the articulation spindle 28 whereas the nut 50 and the pin 56 are maneuvered from a second end of the articulation spindle. As a consequence, this first embodiment requires free space on both sides of the clevis 24.

In order to remedy this drawback, and to allow assembly from just one side of the clevis, a second embodiment shown in FIG. 3 has been developed.

This embodiment is more particularly suited to fasteners 18 located at the front of the engine 10.

Those elements which are in common with the first embodiment are referenced in the same manner.

According to this second embodiment, the sleeve 34 of the first arm 30 of the clevis 24 comprises at a first end an outer shoulder 36 which projects out from the sleeve and which bears against the inner face 301 of the first arm 30 and at a second end an inner shoulder 58 which projects into the sleeve and which acts as a stop against which a first end of the articulation spindle 28 comes to bear in order to limit the movement thereof in translation in the longitudinal direction in a first sense indicated by the arrow 60 in FIG. 3.

The sleeve 34' of the second arm 30' of the clevis 24 comprises at a first end an outer shoulder 36' which projects out from the sleeve and which bears against the inner face 301' of the second arm 30' and at a second end an extension 62 which extends beyond the outer face 30E' of the second arm 30' and which comprises a tapped bore 64 whose diameter is greater than the internal diameter of the sleeve 34'.

According to this second embodiment, a blocking device makes it possible to limit the movement in translation of the articulation spindle 28 in the longitudinal direction in a second sense indicated by the arrow 66 in FIG. 3. The blocking device comprises:
- a first headless screw 68 which is screwed into the tapped bore 64,
- at least one elastic washer 70 interposed between the second end of the articulation spindle 28 and the first headless screw 68,
- a second headless screw 72 which is screwed into the tapped bore 64 and presses against the other side of the first headless screw 68 from the elastic washer(s) 70,
- a flexible or rigid longilinear element 74 which passes through the extension 62 and the second headless screw 72 so as to immobilize said second headless screw 72 in rotation with respect to the extension 62.

The longilinear element 74 corresponds to a first anti-rotation system and mounting the first headless screw 68 between at least one elastic washer 70 and a second headless screw 72 corresponds to a second anti-rotation system.

This second embodiment has the advantage that it is possible to carry out the assembly from just one side of the clevis.

However, installing the headless screws 68 and 72 inside the tapped bore 64 is not easy and requires the use of tools. This installation is even more difficult when the articulation spindles are of smaller diameter. Indeed, in this case, it is necessary to exert a relatively large torque given the small diameter of the headless screws in order to compress the elastic washer(s) and obtain the second anti-rotation system.

The present invention aims to remedy the drawbacks of the prior art.

SUMMARY OF THE INVENTION

To that end, the invention relates to an assembly having an articulation spindle mounted in a first sleeve inserted into a first arm of a clevis and in a second sleeve inserted into a second arm of said clevis. The articulation spindle is immobilized in translation by an inner shoulder of the first sleeve which acts as a stop for a first end of said articulation spindle, and by a blocking device which acts as a stop for a second end of said articulation spindle.

The blocking device comprises a screw which is screwed into an extension of the second sleeve and a longilinear element which is able to adopt a locked state in which said longilinear element passes through the screw and the second sleeve so as to immobilize them in rotation with respect to one another.

According to the invention, the assembly is characterized in that:
- the screw comprises a first cylindrical portion which is configured to be screwed into the extension and acts as a stop for the second end of the articulation spindle, and a second portion, in the extension of the first portion, with a smaller cross section than said first cylindrical portion, and in that
- the blocking device comprises a locking washer which is able to adopt a locked position in which the locking washer is interposed between the second portion of the screw and the extension of the second sleeve and immobilizes the screw in rotation with respect to said extension.

According to this configuration, the screw which is in contact with the articulation spindle comprises a second portion which is always accessible and smaller than the internal diameter of the extension, which facilitates installation of the screw.

The locking washer preferably comprises a circumference having shapes which are complementary with those of the extension so as to allow the locking washer to move in translation in the extension and to prevent the locking washer from rotating with respect to the extension in the locked position of the locking washer.

According to one embodiment, the locking washer comprises two spurs which are diametrically opposite one another, and the extension comprises multiple pairs of notches, the notches of each pair being diametrically opposite one another.

The locking washer preferably comprises an orifice having shapes which are complementary with those of the second portion of the screw so as to allow the locking washer to move in translation on the second portion of the screw and to prevent the locking washer from rotating with respect to the screw in the locked position of the locking washer.

According to one embodiment, the second portion of the screw is of hexagonal cross section and the orifice of the locking washer has a polygonal perimeter, with the number of sides being a multiple of six.

The blocking device preferably comprises means for holding the locking washer in the locked position.

According to one embodiment, the screw comprises an outer shoulder and the means for holding the locking washer in the locked position comprise a circlip which is housed in a channel created in the second portion of the screw, said channel being spaced apart from the outer shoulder by a distance equal to the thickness of the locking washer plus a functional clearance.

Advantageously, the screw comprises multiple through passages which extend in a plane transverse to a longitudinal axis of the screw across several diameters and the extension comprises multiple pairs of orifices distributed over its circumference, each pair of orifices being able to be positioned in the extension of a passage of the screw so as to house the longilinear element.

BRIEF DESCRIPTION OF THE DRAWINGS

Other characteristics and advantages will emerge from the ensuing description of the invention, description given solely by way of example, with regard to the appended drawings in which:

FIG. 3 is a section through an assembly having an articulation spindle which illustrates a second embodiment of the prior art, FIG. 4 is a section on two planes of an assembly having an articulation spindle which illustrates a first embodiment of the invention.

DETAILED DESCRIPTION OF THE PREFERRED EMBODIMENTS

Figure 1:
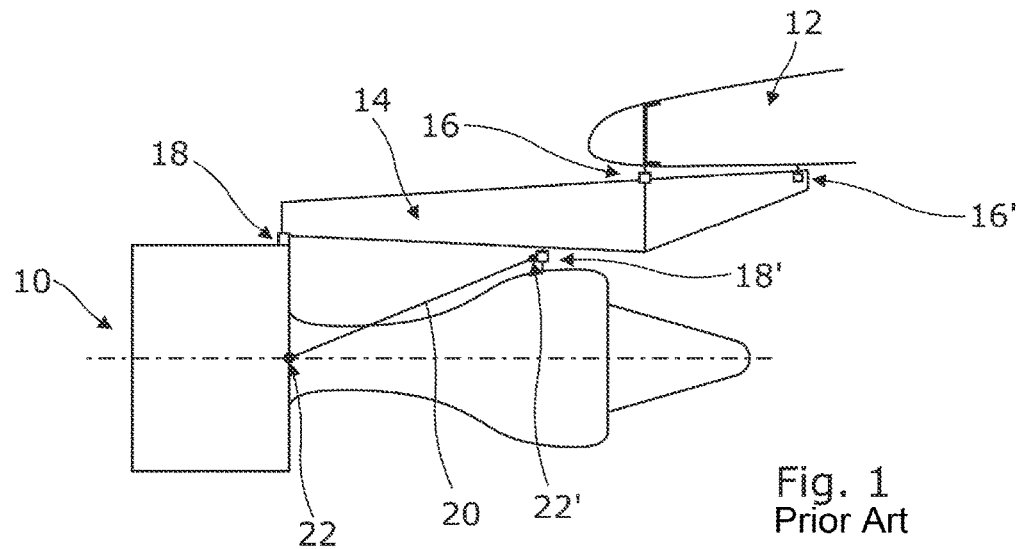
FIG. 1 is a schematic representation of a connection between an engine and a wing of an aircraft.
Figure 2:
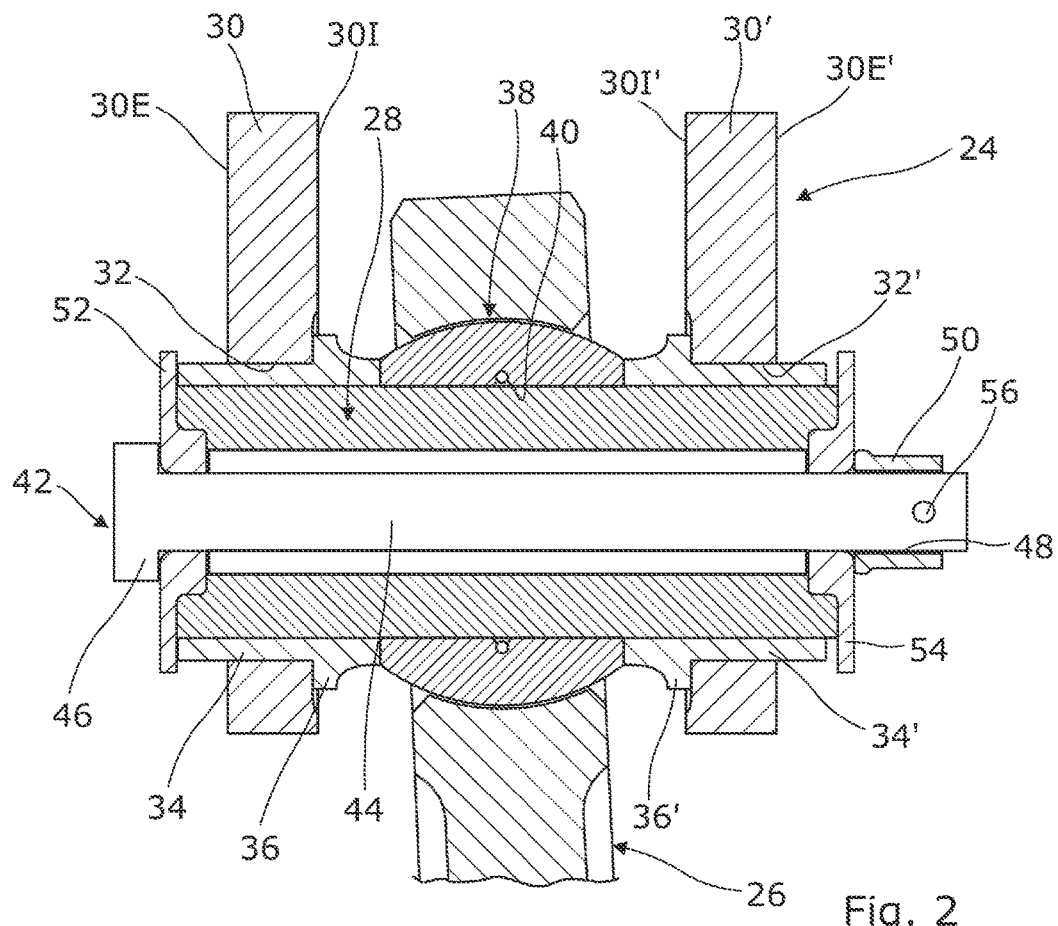
FIG. 2 is a section through an assembly having an articulation spindle which illustrates a first embodiment of the prior art.

FIG. 4 shows an assembly connecting an attachment pylon and an engine of an aircraft.

This assembly comprises a clevis 80 secured to the attachment pylon, a ferrule 82 secured to the engine and an articulation spindle 84 connecting the clevis 80 and the ferrule 82.

Of course, the invention is not limited to this application. It may be used for the other fasteners between the wing/the attachment pylon and the attachment pylon/the engine.

The clevis 80 comprises a first arm 86 and a second arm 86', each comprising an inner face 86I, 86I' and an outer face 86E, 86E', wherein the inner faces 86I and 86I' face each other.

The assembly comprises a first sleeve 88 supported by the first arm 86 and a second sleeve 88' supported by the second arm 86', the first and second sleeves 88, 88' being coaxial and aligned and having substantially equal internal diameters.

In the rest of the description, the longitudinal direction corresponds to the direction of the axes of the sleeves 88, 88'. A transverse plane is perpendicular to the longitudinal direction.

According to one embodiment, the first arm 86 comprises a first through hole 90 which opens at the inner face 86I and outer face 86E of said first arm and into which is inserted the first sleeve 88. In parallel, the second arm 86' comprises a second through hole 90' which opens at the inner face 86I' and outer face 86E' of said second arm 86' and into which is inserted the second sleeve 88'. The outer diameter of the first sleeve 88 is substantially greater than the diameter of the first through hole 90, making an interference fit possible. The outer diameter of the second sleeve 88' is substantially greater than the diameter of the second through hole 90', making an interference fit possible. By virtue of the interference fits, the sleeves 88, 88' are fixed with respect to the arms 86, 86'.

The ferrule 82 comprises a bearing 92 with a cylindrical bearing surface 94 whose diameter is substantially equal to the internal diameters of the sleeves 88, 88'. The bearing 92 is preferably a swivel bearing.

The articulation spindle 84 comprises a solid or hollow cylindrical body whose outer diameter is substantially equal to the internal diameters of the sleeves 88, 88' and the diameter of the cylindrical bearing surface 94 of the bearing of the ferrule.

The first sleeve 88 of the first arm 86 comprises at a first end an outer shoulder 96 which projects out from the first sleeve and which bears against the inner face 86I of the first arm 86 and at a second end an inner shoulder 98 which projects into the sleeve and which acts as a stop against which a first end 100 of the articulation spindle 84 can come to bear when it is installed.

The second sleeve 88' of the second arm 86' comprises at a first end an outer shoulder 96' which projects out from the second sleeve and which bears against the inner face 86I' of the second arm 86' and at a second end an extension 102 in the form of a hollow cylinder which extends beyond the outer face 86E' of the second arm 86' and which ends in a circumferential rim 104 arranged in a transverse plane.

The outer diameter of this extension 102 is substantially equal to or slightly smaller than the outer diameter of the rest of the second sleeve 88'.

The extension 102 comprises an inner bore 106 whose diameter is greater than the internal diameter of the rest of the second sleeve 88'.

The bore 106 comprises at least one tapped portion 108. Preferably, this tapped portion 108 does not extend over the entire length of the bore 106. According to one embodiment, the bore 106 comprises a tapped portion 108 and a smooth portion 108' which each extend over half the length of the bore, the tapped portion 108 being the further from the rim 104.

The articulation spindle 84 is immobilized in translation in the longitudinal direction by means of:
the inner shoulder 98 of the first sleeve 88 which limits the movement of the articulation spindle 84 in the sleeves 88, 88', in the sense of introduction (labeled 110 in FIG. 6), and a blocking device 112 which limits the movement of the articulation spindle 84 in the sense of withdrawing said articulation spindle.

According to one embodiment of the invention, the blocking device 112 comprises:
a screw 114 which is screwed into the tapped portion 108 of the bore 106 of the extension 102 and which comprises a front face 116 which acts as a stop for the second end 118 of the articulation spindle 84 in the blocked state,
a locking washer 120 which is able to adopt a first locked position (shown in FIGS. 4 and 7) in which the locking washer 120 is interposed between the screw 114 and the extension 102 and immobilizes these in rotation with respect to one another, and a second unlocked position (shown in FIGS. 5 and 6) in which said washer 120 is not interposed between the screw 114 and the extension 102 and allows the screw 114 to be unscrewed,
a longilinear element 122 which is able to adopt a locked state in which the longilinear element 122 passes through the screw 114 and the extension 102 of the second sleeve 88' so as to immobilize these in rotation with respect to one another, and an unlocked state in which said longilinear element 122 does not pass through the screw 114 and allows the screw 114 to be unscrewed.

According to the invention, the locking washer 120 acts as a first anti-rotation system and the longilinear element 122 acts as a second anti-rotation system.

Figure 5:
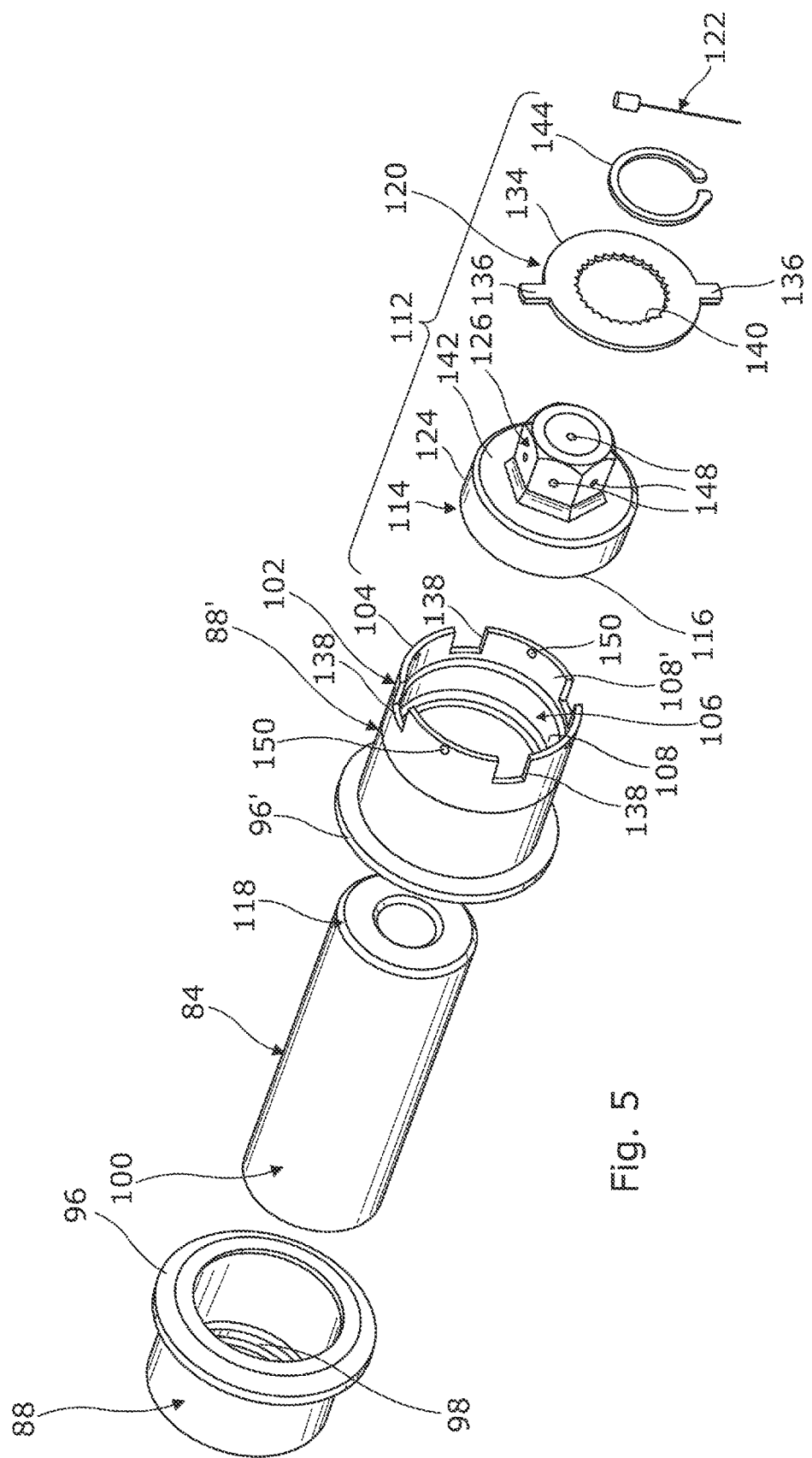
FIG. 5 is an exploded perspective view of certain parts of the assembly shown in FIG. 4.

According to one embodiment shown in FIGS. 4 and 5, the screw 114 comprises:
a first cylindrical portion 124 with a thread which is screwed into the tapped portion 108 of the bore and against which the second end of the articulation spindle comes to bear,
a second portion 126, in the extension of the first portion 124 with a hexagonal external cross section whose largest cross section is smaller than the internal diameter of the smooth portion 108' of the bore 106.

This second portion 126 can be used to maneuver the screw 114.

Figure 6:
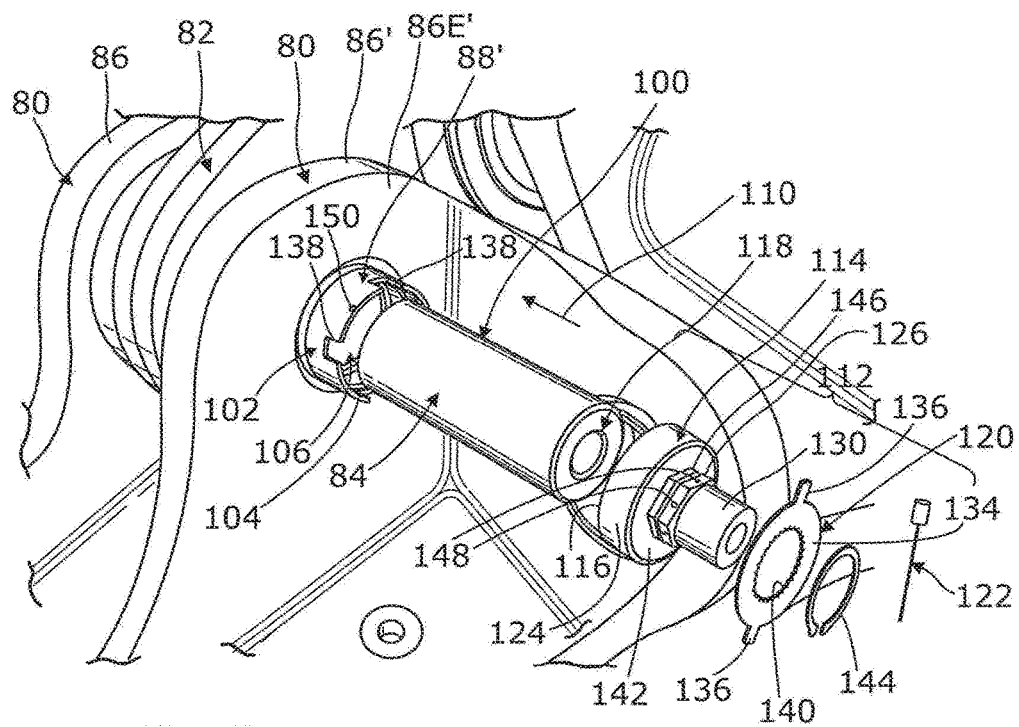
FIG. 6 is a perspective view of an assembly having an articulation spindle which illustrates a second embodiment of the invention, during installation.
Figure 7:
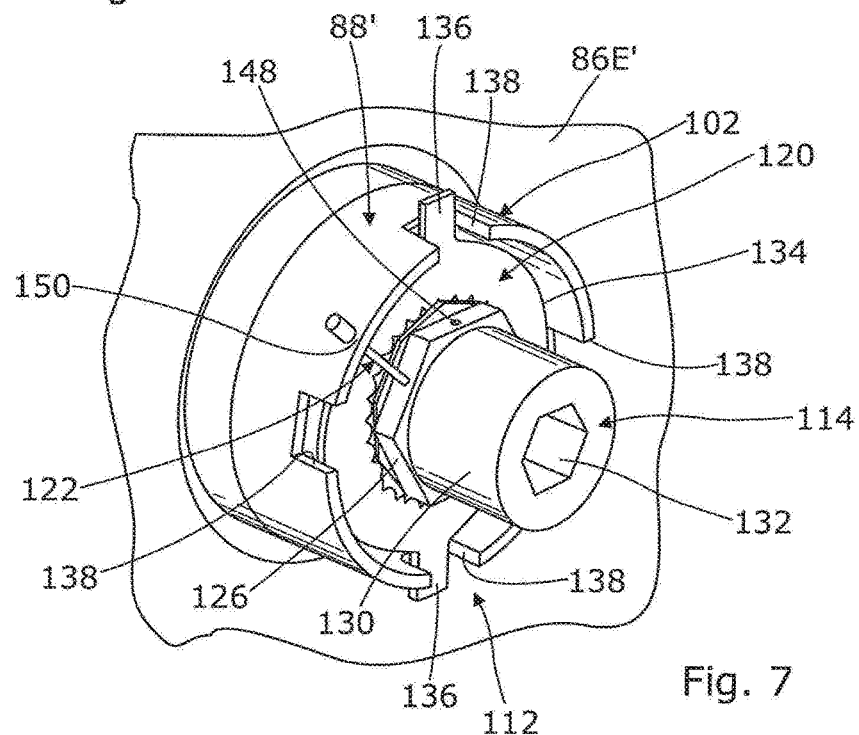
FIG. 7 is a perspective view of one portion of the assembly shown in FIG. 6, in the installed state.

According to a variant shown in FIGS. 6 and 7, the screw 114 comprises, in addition to the first and second portions, a third cylindrical portion 130 whose outer diameter is smaller than the smallest cross section of the second portion 126. This third portion 130 is used to maneuver the screw 114. Advantageously, this third portion 130 comprises a ribbed or knurled outer surface and/or a square or hexagonal recess 132 so as to make said screw 114 easier to screw and unscrew.

In order to be easily maneuverable, the length of the screw 114 is such that it projects beyond the rim 104 of the extension 102 in its locked position.

The locking washer 120 extends in a transverse plane in the locked position.

The locking washer 120 comprises a circumference 134 having shapes which are complementary with those of the extension 102 so as to allow the locking washer 120 to move in translation in the extension 102 and to prevent the locking washer 120 from rotating with respect to the extension 102 in the locked position of the locking washer.

According to one embodiment, the locking washer 120 comprises at least one spur 136 which projects with respect to the circumference 134 and which extends in the same plane as the locking washer 120. Each spur 136 is delimited by a U-shaped perimeter. The locking washer 120 preferably comprises two spurs 136 which are diametrically opposite one another. This latter solution makes it possible to increase the strength of the locking washer.

In addition, the extension 102 comprises at least one notch 138 which extends from the rim 104 in the longitudinal direction and whose shape enables it to house a spur 136 of the locking washer. According to one embodiment, each notch 138 is delimited by a U-shaped perimeter. The extension 102 preferably comprises multiple notches 138 distributed over the perimeter of the rim 104, the notches being distributed so as to allow two diametrically opposite spurs to be housed simultaneously. According to one embodiment, the extension 102 comprises multiple pairs of notches 138, wherein the notches of each pair are diametrically opposite one another. This solution allows the blocking position of the screw 114 to be refined.

The locking washer 120 comprises an orifice 140 having shapes which are complementary with those of the second portion 126 of the screw 114 so as to allow the locking washer 120 to move in translation on the portion 126 of the screw 114 and to prevent the locking washer 120 from rotating with respect to the screw 114 in the locked position of the locking washer. According to one embodiment, the second portion 126 of the screw is of hexagonal cross section.

According to one embodiment, the orifice 140 of the locking washer 120 has a hexagonal perimeter. According to one embodiment shown in FIGS. 5 and 7, the orifice 140 has a polygonal perimeter, with the number of sides being a multiple of six, by means of which the locking washer can be immobilized in multiple positions about the screw 114. This solution allows the blocking position of the screw 114 to be refined.

As the cross section of the second portion 126 is smaller than that of the first portion 124, the two portions 124 and 126 are separated by an outer shoulder 142 which extends in a transverse plane.

The dimension in the longitudinal direction of the notches 138 is adjusted such that the locking washer 120 bears against the shoulder 142 when it is in the locked position.

Advantageously, the blocking device comprises means for holding the locking washer 120 in the locked position.

According to one embodiment, these means take the form of a circlip 144 which is housed in a channel 146 created on the periphery of the screw 114, in particular on the second portion 126. The channel 146 is spaced apart from the shoulder 142 by a distance equal to the thickness of the locking washer 120 plus a functional clearance.

According to one embodiment, the longilinear element 122 takes the form of a flexible element such as a cable or a collar.

According to another embodiment, the longilinear element 122 takes the form of a rigid element such as a pin.

In addition, the screw 114 comprises at least one passage 148 passing through it and the extension 102 comprises at least one pair of orifices 150 arranged in the extension of the passage 148 in the blocking position of the screw 114.

According to one embodiment, the screw 114 comprises multiple through passages 148 which extend in a transverse plane across several evenly angularly spaced diameters. This solution allows the blocking position of the screw 114 to be refined.

According to one embodiment, the extension 102 comprises multiple pairs of orifices 150 distributed over its circumference, each pair of orifices 150 being able to house the longilinear element 122. This solution allows the blocking position of the screw 114 to be refined.

In the absence of a circlip 144, the longilinear element 122 may be used to hold the locking washer in the locked position.

In order to better illustrate the invention, in FIG. 4, the assembly is cut along a first plane passing through the longilinear element above the axis line A and along a second plane of section passing through a spur of the washer below the axis line A.

In order to produce the assembly, the sleeves 88, 88' are inserted into the arms 86, 86' of the clevis 80 from the inside of the arms. The ferrule 82 is then introduced between the arms 86, 86' until the axis of the bearing 92 of the ferrule 82 is aligned with the axes of the sleeves 88, 88'. The articulation spindle 84 is introduced into the sleeves 88, 88' and the bearing 92 from a first side of the clevis. The screw 114 is screwed into the extension 102 until it immobilizes said articulation spindle 84 in translation. This maneuver is simplified by the fact that the screw 114 comprises a portion which is always accessible from outside the extension 102.

The locking washer 120 is interposed between the screw 114 and the extension 102 so as to block the screw 114 in rotation with respect to the extension 102. In order to immobilize the locking washer 120 in the locked position, the circlip 144 is inserted into the channel 146.

Finally, the longilinear element 122 is inserted into a pair of orifices 150 and a through passage 148 so as to block the screw 114 in rotation with respect to the extension 102 and obtain a second anti-rotation system.

The advantages of the assembly according to the invention are as follows:
  this assembly makes it possible to introduce the articulation spindle and to block it in translation from just one side of the clevis. It is thus possible to arrange the clevises of the engine/attachment pylon fasteners so as to allow introduction from one side of the nacelle in the case of a nacelle configuration having a small ground clearance,
  this assembly makes it possible to simplify the installation of the blocking device with a double anti-rotation system and to limit the use of tools,
  this assembly requires no modification to the clevis or the ferrule.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:
1. An assembly comprising:
  an articulation spindle mounted in a first sleeve inserted into a first arm of a clevis and in a second sleeve inserted into a second arm of said clevis,
  said first sleeve comprising an inner shoulder which projects toward the inside of said first sleeve and acts as a stop for a first end of said articulation spindle,
  a blocking device acting as a stop for a second end of said articulation spindle,
  said blocking device comprising a screw which is screwed into an extension of the second sleeve and a longilinear element which is configured to immobilize the screw and the second sleeve in rotation with respect to one another when said longilinear element passes through the screw and the second sleeve, the screw comprising a first cylindrical portion configured to be screwed into the extension and terminating in a face that bears against and acts as a stop for the second end of the articulation spindle, and a second portion, in the extension of the first portion, with a smaller cross section than a cross-section of said first cylindrical portion, wherein the second portion extends beyond the extension when the longilinear element passes through the screw and the second sleeve, and the blocking device comprising a locking washer which comprises a circumference having shapes which are complementary with a shape of the extension to allow the locking washer to move in translation in the extension and to prevent the locking washer from rotating with respect to the extension in a locked position of the locking washer, and wherein the shapes of the circumference of the locking washer comprise at least one spur which projects with respect to the circumference and which extends in the same place as the locking washer, and wherein the shape of the extension comprises at least one notch configured so as to receive a spur of the locking washer, and wherein the locking washer further comprises an orifice having a shape which is complementary with a shape of the second portion of the screw so as to allow the locking washer to move in translation on the second portion of the screw and to prevent the locking washer from rotating with respect to the screw in the locked position of the locking washer, and wherein the locking washer is configured to immobilize the screw in rotation with respect to said extension when the locking washer is interposed between the second portion of the screw and the extension of the second sleeve.

2. The assembly as claimed in claim 1, wherein the locking washer comprises two spurs which are diametrically opposite one another, and wherein the extension comprises multiple pairs of notches, the notches of each pair being diametrically opposite one another.

3. The assembly as claimed in claim 1, wherein the second portion of the screw is of hexagonal cross section.

4. The assembly as claimed in claim 3, wherein the orifice of the locking washer has a polygonal perimeter, with the number of sides being a multiple of six.

5. The assembly as claimed in claim 1, wherein the blocking device comprises means for holding the locking washer in the locked position.

6. The assembly as claimed in claim 5, wherein the screw comprises an outer shoulder and wherein the means for holding the locking washer in the locked position comprise a circlip which is housed in a channel created in the second portion of the screw, said channel having a width equal to the thickness of the locking washer plus a functional clearance.

7. The assembly as claimed in claim 1, wherein the screw comprises multiple through passages which extend in a plane transverse to the screw across several diameters, each passage being able to house the longilinear element.

8. The assembly as claimed in claim 1, wherein the extension comprises multiple pairs of orifices distributed over its circumference, each pair of orifices being able to house the longilinear element.

9. An assembly comprising:
an articulation spindle mounted in a first sleeve inserted into a first arm of a clevis and in a second sleeve inserted into a second arm of said clevis,
said first sleeve comprising an inner shoulder projecting toward an inside of said first sleeve and acting as a stop for a first end of said articulation spindle,
a screw comprising a first portion, a second portion, and a third portion, the first portion configured to be screwed into an extension of the second sleeve and terminating in a face that bears against and act as a stop for the second end of the articulation spindle, the first portion being cylindrical, the second portion comprising a polygonal cross section smaller than a cross-section of the first cylindrical portion, wherein the second portion is disposed between the first and third portions, and, the third portion extending out of the extension, being cylindrical with a knurled surface, and having a smaller cross section than a cross-section of the first cylindrical portion,
a longilinear element which is configured to immobilize the screw and the second sleeve in rotation with respect to one another when said longilinear element passes through the second portion of the screw and the second sleeve, and
a locking washer comprising at least one spur configured to be received by at least one notch in the extension, the locking washer further comprising an orifice having a complementary shape to the polygonal cross section of the second portion of the screw, and,
wherein when the locking washer is interposed between the second portion of the screw and the extension of the second sleeve, the at least one spur is received in the at least one notch in the extension and the orifice engages the polygonal cross section of the second portion of the screw such that the screw is immobilized in rotation with respect to the extension.

10. The assembly of claim 9 wherein the second portion of the screw has a hexagonal outer surface.

11. The assembly of claim 9 wherein the second portion includes an outer surface and a channel in the outer surface and further comprising a circlip configured to be inserted into the channel in the outer surface of the second portion of the screw.

12. The assembly of claim 9 wherein the locking washer includes a plurality of spurs and wherein the second sleeve includes a plurality of notches configured to house a spur from the plurality of spurs.

13. The assembly of claim 9 wherein the orifice of the locking washer comprises a polygonal perimeter, wherein a number of sides of the polygonal perimeter is greater than a number of sides of the polygonal cross section of the second portion of the screw.

* * * * *